United States Patent
Hammond et al.

(10) Patent No.: US 6,584,558 B2
(45) Date of Patent: *Jun. 24, 2003

(54) ARTICLE FOR PROVIDING EVENT HANDLING FUNCTIONALITY IN A PROCESSOR SUPPORTING DIFFERENT INSTRUCTION SETS

(75) Inventors: Gary Hammond, Campbell, CA (US); Donald Alpert, Santa Clara, CA (US); Kevin Kahn, Portland, OR (US); Harsh Sharangpani, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/132,554

(22) Filed: Apr. 24, 2002

(65) Prior Publication Data

US 2002/0120832 A1 Aug. 29, 2002

Related U.S. Application Data

(63) Continuation of application No. 09/770,970, filed on Jan. 25, 2001, now Pat. No. 6,408,386, which is a division of application No. 09/048,241, filed on Mar. 25, 1998, now Pat. No. 6,219,774, which is a continuation of application No. 08/482,239, filed on Jun. 7, 1995, now Pat. No. 5,774,686.

(51) Int. Cl.[7] .............................................. G06F 9/40
(52) U.S. Cl. ...................................... 712/244; 710/269
(58) Field of Search .......................... 710/269; 712/244

(56) References Cited

U.S. PATENT DOCUMENTS

| 5,481,684 A | 1/1996 | Richter et al. ............... 712/212 |
| 5,481,693 A | 1/1996 | Blomgren et al. ........... 712/225 |
| 5,530,881 A | 6/1996 | Inagami et al. ................ 712/7 |
| 5,542,059 A | 7/1996 | Blomgren ..................... 712/41 |
| 5,574,927 A | 11/1996 | Scantlin ........................ 712/41 |
| 5,598,546 A | 1/1997 | Blomgren ................... 712/209 |
| 5,638,525 A * | 6/1997 | Hammond et al. .......... 712/209 |
| 5,740,461 A | 4/1998 | Jagger ......................... 712/41 |
| 5,765,206 A | 6/1998 | Hohensee et al. ........... 711/203 |

(List continued on next page.)

OTHER PUBLICATIONS

Shanley, Tom and Anderson, Don, ISA System Architecture, Chapters 5, 8, 10, 11 and 18, Published by Mindshare, Inc. Second Edition Oct. 1993.

I486 Microprocessor Programmer's Reference Manual, Intel Corporation, 1990, pp. 1–1–1–9, 2–2–2–24, 3–1–3–34, 4–1–4–11, 5–1—5–25, 6–1—6–25, 7–1—7–15, 8–1–8–8, 9–1—9–26, 19–1—19–6, 21–1—21–5, 22–1—22–12, 23–1—23–15, 24–1-24–8, 26–1—26–289.

Kane, Gerry and Heinrich, Joe, MIPS RISC Architecture, pp. 1–1—4–30, 6–1—6–57, 9–1—9–12, Published by Prentiss–Hall, Inc. 1992.

Wyant, Gregg and Hammerstrom, Tucker, How Microprocessors Work, Intel Corporation 1994, pp. 78–102, 119–185.

*Primary Examiner*—Kenneth S. Kim
(74) *Attorney, Agent, or Firm*—Blakely, Sokoloff, Taylor & Zafman LLP

(57) ABSTRACT

An article representing a processor providing event handling functionality is described. According to one embodiment of the invention, the article includes a machine readable medium storing data representing a processor including an instruction set unit and an event handling unit, as well as a first plurality of event handlers that includes a first event handler. The instruction set unit is to support a first and second instruction sets. Problems that arise during the processing of instructions from the first and second unit are to cause the article to execute the appropriate one of the first plurality of event handlers. At least some of the first set of events are mapped to different ones of the first plurality of event handlers. All of the second set of events are mapped to the first event handler.

15 Claims, 9 Drawing Sheets

U.S. PATENT DOCUMENTS

| | | |
|---|---|---|
| 5,802,382 A | 9/1998 | Greenberger et al. .......... 712/36 |
| 5,815,686 A | 9/1998 | Earl et al. ...................... 703/26 |
| 5,854,913 A | 12/1998 | Goetz et al. ................. 712/210 |
| 5,953,520 A | 9/1999 | Mallick ....................... 703/26 |
| 5,968,162 A | 10/1999 | Yard ........................... 712/203 |
| 6,021,265 A | 2/2000 | Nevill ......................... 712/209 |
| 6,038,661 A * | 3/2000 | Yoshioka et al. ............ 710/269 |
| 6,079,015 A * | 6/2000 | Harwood et al. ............ 712/244 |

* cited by examiner

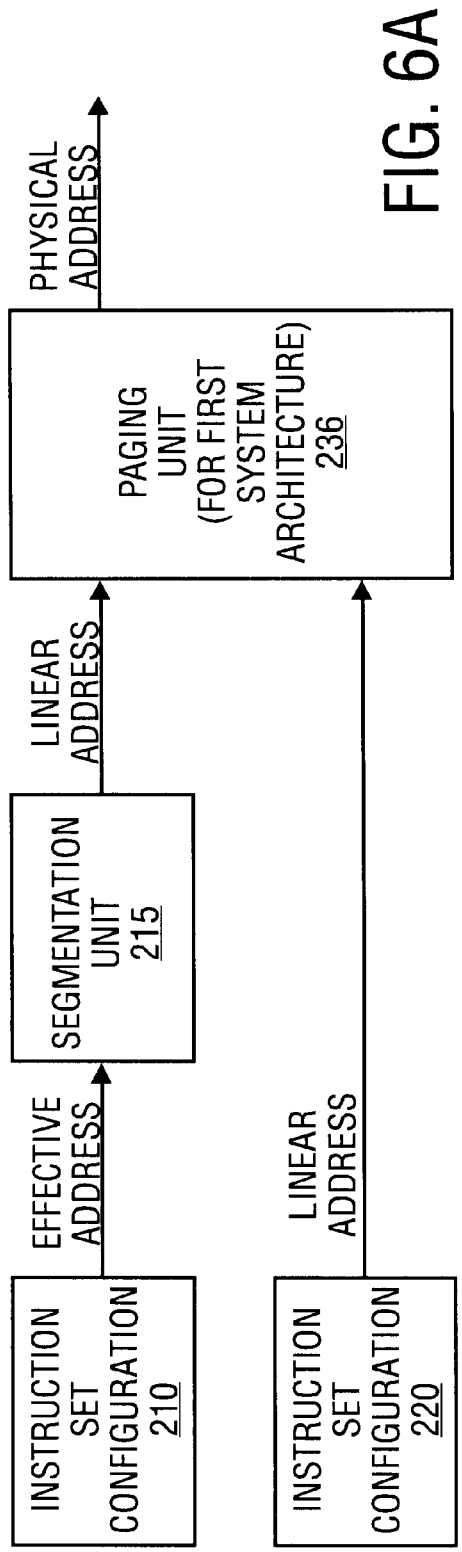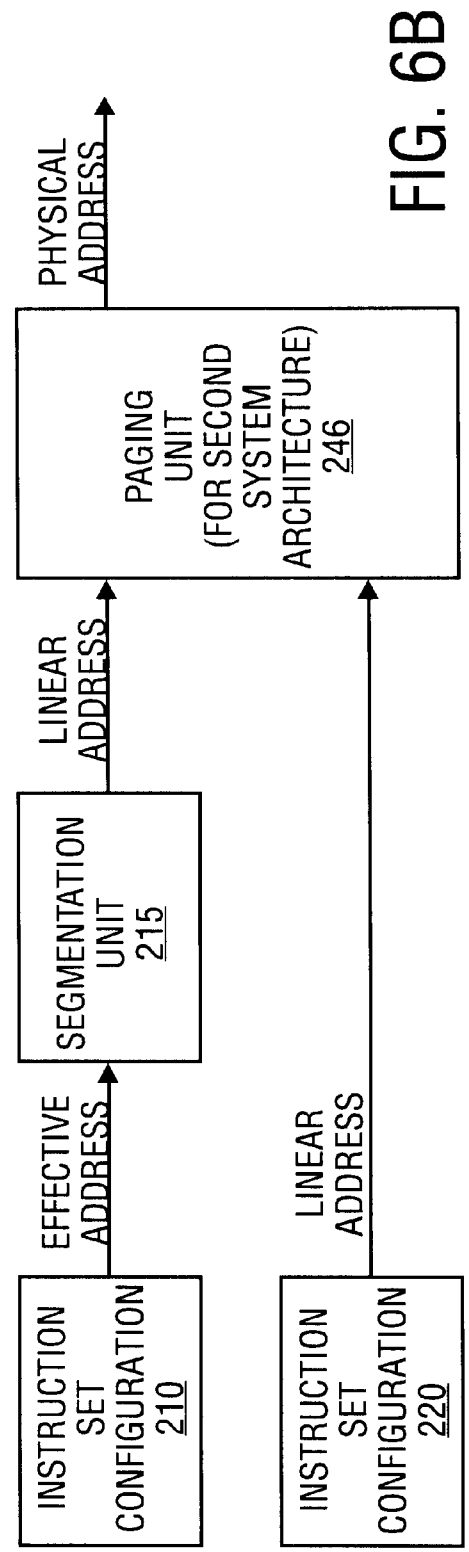

ARTICLE FOR PROVIDING EVENT HANDLING FUNCTIONALITY IN A PROCESSOR SUPPORTING DIFFERENT INSTRUCTION SETS

CROSS-REFERENCE TO RELATED APPLICATION

This is a continuation of application Ser. No. 09/770,970, filed Jan. 25, 2001, issued as U.S. Pat. No. 6,408,386, which is a divisional of application Ser. No. 09/048,241, filed Mar. 25, 1998, issued as U.S. Pat. No. 6,219,774, which is a continuation of application Ser. No. 08/482,239, filed Jun. 7, 1995 and issued as U.S. Pat. No. 5,774,686.

BACKGROUND OF THE INVENTION

1. Field of the Invention

The invention relates to the field of electronic data processing devices. More specifically, the invention relates to the operation of processors.

2. Background Information

As computer systems continue to evolve, it is desirable to develop more technologically advanced processors which use new instruction sets and/or new resources for supporting operating system type functions. For example, it has recently become desirable to develop processors which incorporate RISC based instruction sets and/or which utilize larger address spaces. At the same time, it is desirable to remain compatible with the existing base of software (including operating systems) developed for previous processors. The term architecture is used herein to refer to all or part of a computer system, and may include chips, circuits, and system programs.

One prior art architecture which attempted to deal with this limitation is implemented in the VAX-11. The VAX-11 incorporates a new instruction set and extends the PDP-11 architecture from using 16 addressing bits to using 32 addressing bits. The VAX-11 is capable of executing application programs written in either the new VAX-11 instruction set or the PDP-11 instruction set. However, the VAX-11 has several limitations. One such limitation is that the VAX-11 cannot execute an application program written with instructions from both instruction sets because it lacks the ability to share data generated by the different instruction sets. Thus, the VAX-11 does not provide the option of using the new instruction set where justified by performance advantages and using the existing software where justified by development cost considerations. As a result, software developers have the difficult choice of either incurring large development costs to develop an entirely new application program or forgoing the benefits offered by the new instruction set. Another limitation is that the VAX-11 provides one mechanism for supporting operating system type functionality (e.g., only one memory management mechanism and only one event handling mechanism) and can only accept an operating system written in the new VAX-11 instruction set. As a result, previously developed operating systems were not compatible, and an entirely new operating system had to be developed. Further limitations of the VAX-11 include a lack of non-privileged transitions between VAX-11 and PDP-11 instruction set modes, PDP-11 floating-point instructions, privileged execution in the PDP-11 instruction set mode, and input/output accessing in the PDP-11 instruction set mode.

Another prior art architecture which faces this limitation is the Intel® 386 processor (manufactured by Intel Corporation of Santa Clara, Calif.). The 386 processor expanded the Intel 286 processor (manufactured by Intel Corporation of Santa Clara, Calif.) architecture from 16 bits to 32 bits. However, the 386 processor did not include a new instruction set, but expanded the instruction set used by the 286 processor. In addition, the 386 processor provided only one method of implementing operating system type functions.

Another prior art architecture which faces this limitation is implemented in the MIPS R4000 processor manufactured by MIPS Computer Systems, Inc. of Sunnyvale, Calif. The R4000 processor expanded the R3000 processor to 64 bits. However, the R4000 processor did not include a new instruction set, but just expanded the instruction set used by the R3000 processor. In addition, the R4000 processor provided only one method for providing operating system type functions.

SUMMARY OF THE INVENTION

A processor having two system configurations is provided. The apparatus generally includes an instruction set unit, a system unit, an internal bus, and a bus unit. The instruction set unit, the system unit, and the bus unit are coupled together by the internal bus. The system unit is capable of selectively operating in one of two system configurations. The first system configuration provides a first system architecture, while the second system configuration provides a second system architecture. The bus unit is used for sending and receiving signals from the instruction set unit and the system unit. According to another aspect of the invention, the instruction set unit is capable of selectively operating in one of two instruction set configurations. The first instruction set configuration provides for the execution of instruction belonging to a first instruction set, while the second instruction set configuration provides for the execution of instructions belonging to a second instruction set.

BRIEF DESCRIPTION OF THE DRAWINGS

The invention may best be understood by referring to the following description and accompanying drawings which illustrate the invention. In the drawings:

FIG. 6a is a functional block diagram illustrating one method of memory management according to one embodiment of the invention;

FIG. 6b is a functional block diagram illustrating another method of memory management according to one embodiment of the invention;

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Although a more detailed explanation will be provided below, it is thought worthwhile to first provide a brief overview of the invention. This application describes a method and apparatus for providing a processor which incorporates a new instruction set and advanced resources for providing operating system type support (e.g., event handling, memory management, etc.), while maintaining compatibility with previously developed software. In one embodiment, the processor can selectively operate in one of two instruction set configurations and in one of two system configurations. The first instruction set configuration and system configuration are similar to and compatible with previously developed processors, and thus are compatible with existing software (including operating systems). However, the second system configuration provides a new system architecture which supports different techniques for providing typical operating system type functions. In addition, the second instruction set configuration provides a new instruction set architecture for which new software (including operating systems) can be written. Furthermore, either instruction set configuration can be used in conjunction with either system configuration. As a result, single programs may utilize both instruction sets, and operating systems may use both system architectures.

Figure 1:
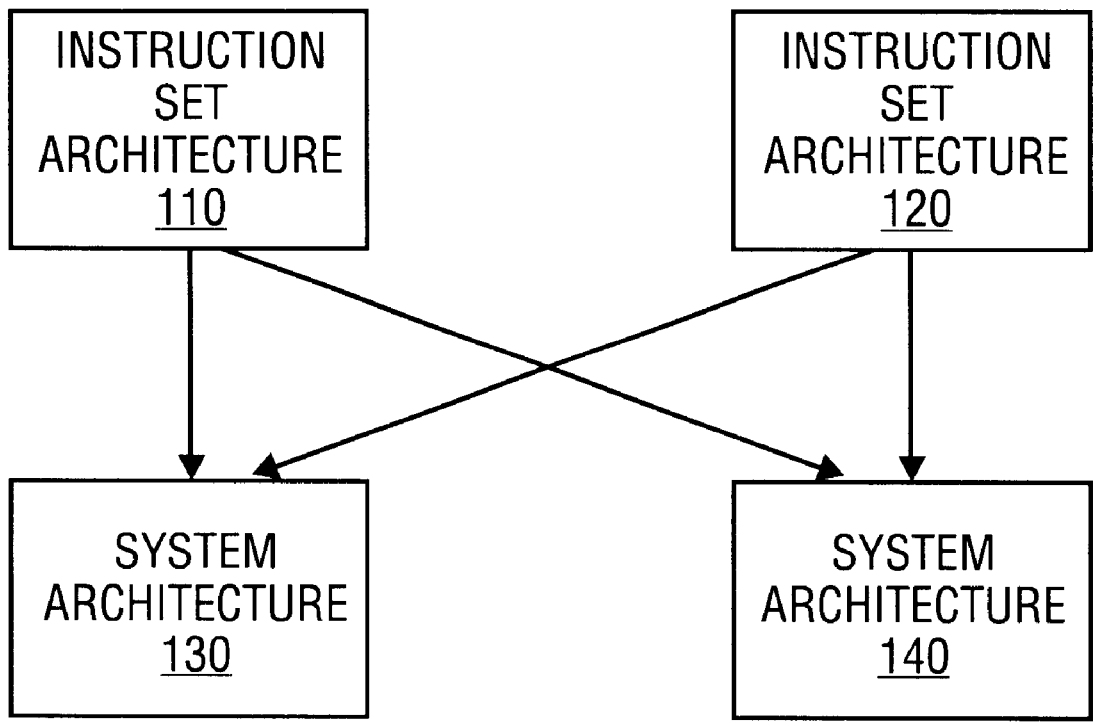
FIG. 1 illustrates a functional block diagram of one embodiment of the invention.

FIG. 1 shows a functional block diagram illustrating an overview of one embodiment of the invention. FIG. 1 shows an instruction set architecture 110, an instruction set architecture 120, a system architecture 130, and a system architecture 140.

Instruction set architecture 110 is used for executing instructions from a first instruction set, while instruction set architecture 120 is used for executing instructions from a second instruction set. Thus, instruction set architectures 110 and 120 include all necessary software, firmware and hardware to provide for the execution of two instruction sets— one instruction set each. In one embodiment, instruction set architecture 110 is a CISC (complex instruction set computing) type architecture substantially compatible with an existing instruction set for the Intel x86 Microprocessor family. However, in this embodiment, instruction set architecture 120 is an advanced instruction set architecture which supports a new instruction set. Of course, alternative embodiments may implement the instruction set architectures in any combination of CISC, RISC, VLIW, or hybrid type architectures. In addition, alternative embodiments may implement the instruction set architectures to support two new instruction sets (one instruction set each) or to support two existing instruction sets (one instruction set each).

System architecture 130 supports a first technique of performing operating system type functions, including memory management and event handling. In contrast, system architecture 140 supports a second technique of performing operating system type functions, including memory management and event handling. Thus, system architectures 130 and 140 each include all necessary software, firmware, and hardware to provide for typical operating system functionality. In one embodiment, system architecture 130 is compatible with previously developed operating systems (such as MS-DOS and Windows available from Microsoft Corporation of Redmond, Wash.), while system architecture 140 provides advanced resources which new operating systems may utilize.

In addition, FIG. 1 shows that both instruction set architectures 110 and 120 may be used in conjunction with either of system architectures 130 and 140. In this manner, compatibility is maintained with the existing software base (including operating systems) developed for instruction set architecture 110 and system architecture 130, while allowing for the development of new software (including operating systems) which uses the new instruction set architecture 120 and system architecture. As an example, an operating system written in one of the instruction sets and using one of the system architectures can multitask applications written in either of the instruction sets. While one embodiment is described in which both instruction set architectures 110 and 120 may interact with either of system architectures 130 and 140, alternative embodiments may not support all of the interactions described in FIG. 1. For example, alternative embodiments may not support interaction between instruction set architecture 120 and system architecture 130.

One aspect of the invention is that the processor supports multiple system architectures. Thus, the number of instruction sets and/or system architectures supported, as well as the type of instruction sets and system architectures supported, are not critical to this aspect of the invention. What is important to this aspect of the invention is that the processor can switch between the instruction set architectures and system architectures. For example, alternative embodiments may support one instruction set and two system architectures. As another example, alternative embodiments may support three instruction set architectures and two system architectures. Other alternative embodiments may support three instruction set architectures and three system architectures. An embodiment which supports two instruction set architectures and two system architectures is described so as not to obscure the invention.

Figure 2:
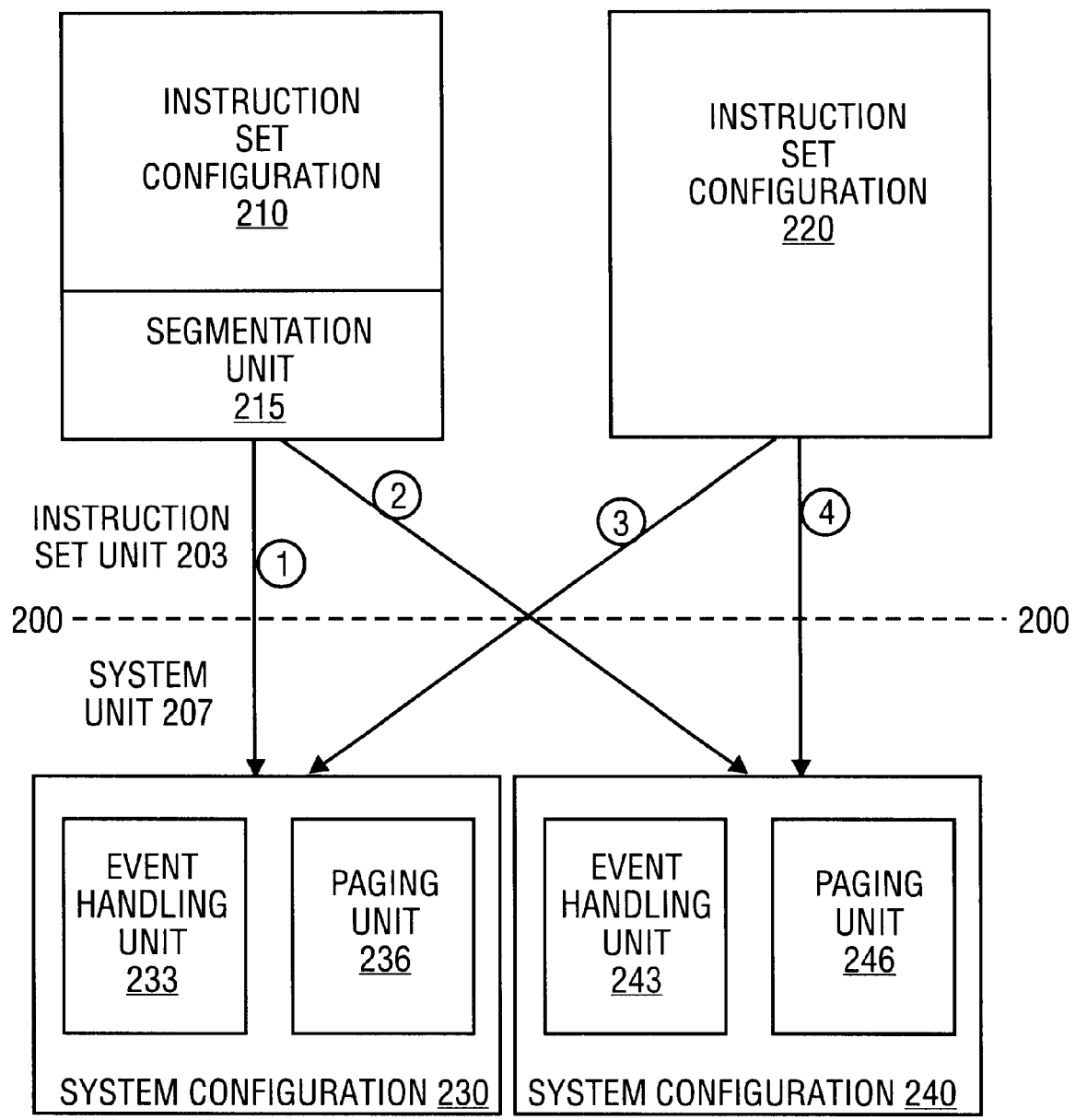
FIG. 2 is a functional block diagram illustrating the different selectable configurations in which a processor may operate according to one embodiment of the invention.

FIG. 2 shows a functional block diagram illustrating the selectable configurations or modes of a processor according to one embodiment of the invention. FIG. 2 shows a line 200 representing that the processor includes an instruction set unit 203 and a system unit 207. FIG. 2 also shows that instruction set unit 203 selectively operates in either an instruction set configuration 210 or in an instruction set configuration 220. In one embodiment, instruction set configuration 210 includes segmentation unit 215. Segmentation unit 215 allows for compatibility with existing x86 memory management techniques which utilize segmentation. In addition, FIG. 2 shows system unit 207, which selectively operates in either a system configuration 230 or a system configuration 240.

Instruction set unit 203 executes instructions from a first instruction set while instruction set configuration 210 is selected. In one embodiment, this first instruction set is based on the 16/32-bit x86 instruction set used by existing Intel microprocessors. This instruction set operates using what are referred to as effective or logical addresses. Instruction set configuration 210 sends these effective addresses to segmentation unit 215 which translates them into linear addresses. The technique of segmentation is well known in the prior art and is further described in the following reference: Shanley, Tom and Anderson, Don, ISA System Configuration, MindShare, Inc. (1993). Thus, instruction set configuration 210 with segmentation unit 215 provides a first instruction set architecture. Alternative embodiments which support other instruction sets may require other address translation techniques (rather than or in addition to segmentation), or may not require any address translation.

Instruction set unit 203 executes instructions from a second instruction set which is different from the first instruction set, while instruction set configuration 220 is selected. In one embodiment, this second instruction set is a 64-bit instruction set which operates using the same format of address generated by segmentation unit 215 (i.e., linear addresses). Since this 64-bit instruction set uses linear addresses, it can address the entire 64-bit virtual address space and does not require segmentation. In this manner, instruction set configuration 220 provides a second instruction set architecture.

Thus, instruction set unit 203 includes all necessary software, firmware, and hardware to provide for the execution of two instruction sets. In one embodiment, instruction set unit 203 includes at least one prefetch unit, decode unit, and execution unit, as well as a mechanism for switching between the two instruction set configurations (not shown). One embodiment of instruction set unit 203 will be later described with reference to FIG. 8. While one embodiment of instruction set unit 203 has been described in which it is implemented on the processor, alternative embodiments could implement all or part of instruction set unit 203 in hardware residing outside the processor, or in software.

System unit 207 provides a first system architecture while system configuration 230 is selected. This first system architecture supports typical operating system functions according to a first system technique. In one embodiment, system configuration 230 is compatible with existing x86 processors and includes an event handling unit 233 and a paging unit 236. Event handling unit 233 provides for the selection of the appropriate service routine or handler in response to each of a predefined set of events according to a first event handling method or technique. It is worthwhile to note that the term "event" is used herein to refer to any action or occurrence to which a computer system might respond (i.e., hardware interrupts, software interrupts, exceptions, traps, faults, etc.). As will be further described later with reference to FIGS. 5a and 5b, in one embodiment, event handling unit 233 may be implemented in a corresponding fashion to that of previous x86 based Intel microprocessors (i.e., an interrupt descriptor table stored in memory containing pointers to service routines). In one embodiment, paging unit 236 provides for virtual memory by allowing for the translation of the linear addresses generated by both segmentation unit 215 and instruction set configuration 220 into physical addresses according to a first paging method or technique. As will be described later with reference to FIG. 6a, paging unit 236 is implemented in a corresponding fashion to that of previous x86 based Intel microprocessors (i.e., the linear addresses outputted by segmentation unit 215 and instruction set configuration 220 are used by paging unit 236 to identify a page table, a page described in that table, and an offset within that page).

In contrast, system unit 207 provides a second system architecture while system configuration 240 is selected. This second system architecture is different than the first system architecture and supports typical operating system functions according to a second system technique. In one embodiment, system configuration 240 includes an event handling unit 243 and a paging unit 246. Event handling unit 243 provides for the selection of the appropriate service routine or handler in response to an event according to a second event handling method or technique. As will be further described later with reference to FIGS. 6a and 6b, one embodiment of event handling unit 243 is implemented using an event handler region stored in memory. The event handler region is broken down into fixed size sections (also termed as "entries") of 512 bytes, each containing a 64-bit handler (if additional space is needed to store a handler, a jump may be made to another area in memory). One or more events are assigned to each section. In response to an event, the processor stores event information identifying the event, determines the section in the event handler region to which that event corresponds, and begins executing the handler stored in that entry. The handler uses the event information stored by the processor to determine which event has occurred and services that event (i.e., executes the appropriate set of instructions). In one embodiment, paging unit 246 provides for virtual memory by allowing for the translation of the linear addresses generated by both segmentation unit 215 and instruction set configuration 220 into 64-bit physical addresses according to a second paging method or technique. As will be further described later with reference to FIG. 6b, paging unit 246 is implemented using an operating system specific algorithm stored in memory in one embodiment of the invention. Thus, this system configuration leaves the definition of the translation algorithms and page data structures up to the operating system. In this manner, the addressing range is increased to 264 bytes and the operating system is free to implement any one of a number of paging schemes.

Thus, system unit 207 represents all necessary firmware and hardware to provide for two approaches to supporting operating system type functions. System unit 207 includes memory management hardware, event handling hardware, and a mechanism for switching between the two system configurations. While one embodiment has been described in which system unit 207 is implemented on the processor, alternative embodiments could implement all or part of system unit 207 in hardware or software residing outside the processor. One embodiment of system unit 207 will be later described with reference to FIG. 9.

FIG. 2 also shows that both instruction set configuration 220 and instruction set configuration 210 with segmentation unit 215 may be selectively used in conjunction with both system configuration 230 and system configuration 240. In this manner, the processor provides for two alternative instruction set architectures and two alternative system architectures.

It is readily understood that the number of bits for either instruction set architectures (e.g., a 32-bit instruction set and a 64-bit instruction set) and either system architectures (e.g., 16/32 bits and 64 bits) is a design choice. For example, an alternative embodiment may support 64-bit and 128-bit instruction set architectures and system architectures. As another example, an alternate embodiment may support two instruction set architectures and/or system architectures of the same size (e.g., 32-bit).

Switching between instruction set architectures and system architectures may be accomplished using a variety of mechanisms. In one embodiment, to provide for the selection of the different configurations, the processor contains a control register within which it stores: 1) an extension flag which enables the selection of instruction set configuration 220 and system configuration 240, 2) an instruction set flag which allows for the selection of either of instruction set configuration 210 or 220 (while such selection is enabled by the extension flag), and 3) a system flag which allows for the selection of either of system configuration 230 or 240 (while such selection is enabled by the extension flag). Thus, depending on the status of these flags, the processor configures the hardware to operate in the selected configuration. The operating system can alter the states of these indications to select the configuration of choice.

In this embodiment, when the computer is turned on, the BIOS boots the computer storing the extension flag in the disable state. While the extension flag indicates the disable state, both instruction set configuration 210 and system configuration 230 are selected and both the instruction set flag and the system flag are ignored. Thus, the processor boots in the mode illustrated by line 1 in FIG. 2. In this manner, if a previously developed operating system which does not support the new instruction set or system configuration is executed, the extension flag will remain in the disable state; thereby preventing programs from attempting to use the new instruction set or system configuration. However, the x86 based instruction set used by instruction set configuration 210 includes a new instruction for altering the state of the extension flag. This allows new operating systems that support the use of the new instruction set and/or system configuration to alter the state of the extension flag to the enable state, thereby causing the current configuration of the processor to be selected based on the instruction set flag and the system flag. As will be further described, both the x86 based instruction set and the 64-bit based instruction set also include instructions for altering the states of the instruction set flag and system flag. This allows software to switch between the different configurations of the processor. Thus, when the extension flag is in the enable state, the processor may be caused to operate in any one of the modes illustrated by lines 1, 2, 3, and 4 of FIG. 2. For example, the instruction set flag and the system flag may be altered to select instruction set configuration 210 and system configuration 240 (i.e., the mode represented by line 2 of FIG. 2).

When the processor switches system configurations, the processor must be re-configured. This re-configuring depends on the implementation, but can include purging all prior system configuration information, flushing one or more TLBs, flushing registers, configuring the memory management unit (e.g., filling the TLB, loading page tables, etc.), and configuring the event handling unit (e.g., storing the appropriate handlers in memory).

Figure 3:
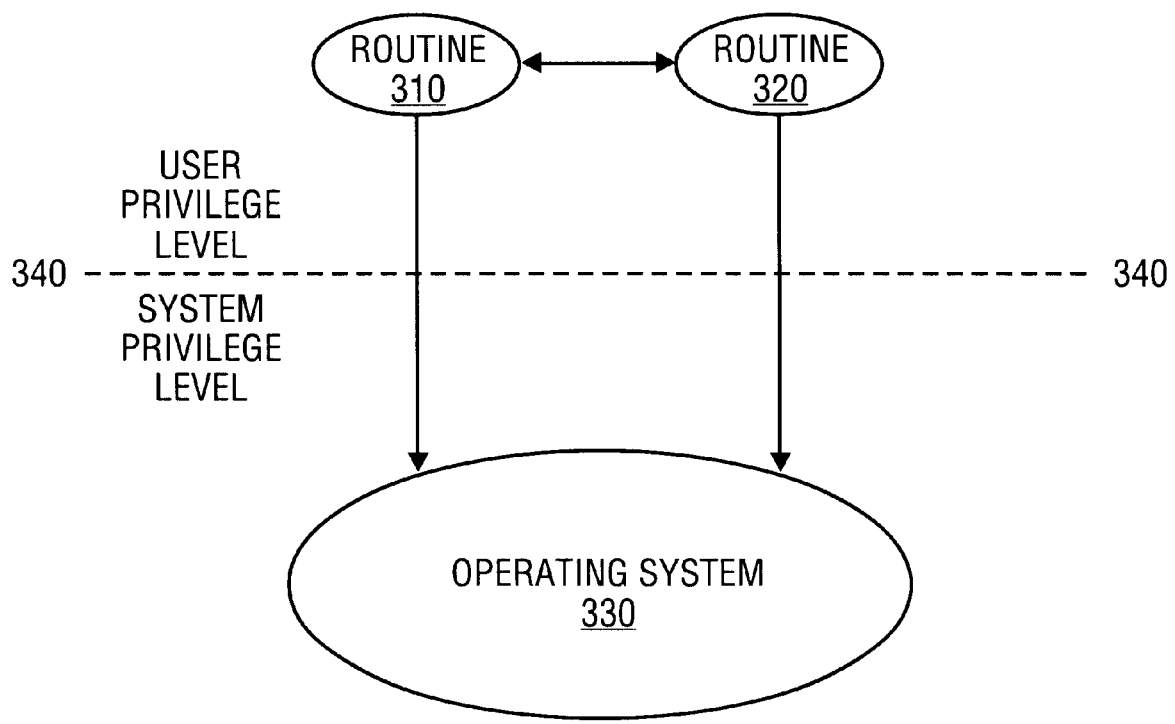
FIG. 3 is a functional block diagram illustrating software for use according to one embodiment of the invention.

FIG. 3 shows a functional block diagram illustrating software for use with the system shown in FIG. 2. FIG. 3 shows a routine 310, a routine 320, and an operating system 330. Routine 310 is implemented in the first instruction set utilized by instruction set configuration 210, while routine 320 is implemented in the second instruction set utilized by instruction set configuration 220. In addition, operating system 330 may be written to utilize either or both of system configurations 230 and 240.

Furthermore, in one embodiment, the instruction set for instruction set configuration 210 includes one or more instructions for causing the processor to transition to instruction set configuration 220, and the instruction set for instruction set configuration 220 includes one or more instructions for causing the processor to transition to instruction set configuration 210. As a result, routines written to execute on one instruction set configuration can call routines written to execute on the other instruction set configuration. Thus, FIG. 3 also shows routine 310 and routine 320 can call each other. In this manner, existing software may be incrementally translated on a performance and/or cost-analysis basis from the x86 based instruction set to the 64-bit instruction set.

FIG. 3 also illustrates that routine 310 and routine 320 can both be executed in conjunction with operating system 330, regardless of whether operating system 330 is using system configuration 230 and/or 240. Thus, the processor can execute routines written for either instruction set configuration 210 or 220 while executing a single operating system using one or both of system configurations 230 and 240. In addition, the processor is capable of switching instruction sets each time it enters and leaves the operating system, thus operating system 330 can be written to execute on either or both of instruction set configurations 210 and 220. In this manner, existing operating systems may be incrementally translated on a performance and/or cost analysis basis to the 64-bit instruction set and/or the new system architecture.

In addition, FIG. 3 shows line 340 to indicate routine 310 and routine 320 (e.g., applications) execute in one or more user privilege levels (also termed as the "user mode"), while operating system 330 executes in one or more system privilege levels (also termed as the "kernel mode"). While the processor is operating in the user privilege levels, processes are not able to instruct the processor to alter information utilized in conjunction with the system configurations (e.g., the system flag). Thus, routines executing in the user privilege levels cannot cause the processor to switch system configurations. In contrast, while the processor is operating in the system privilege levels, routines are able to instruct the processor to modify information utilized in conjunction with the system configurations. The instruction sets for instruction set configuration 210 and instruction set configuration 220 each include one or more instructions for causing the processor to transition to use the other instruction set. These instructions may be execute in both the user and system privilege levels and without requiring a privilege level change. As a result, FIG. 3 shows that routine 310 and routine 320 can call each other while the processor remains in the user privilege levels.

Figure 4A:
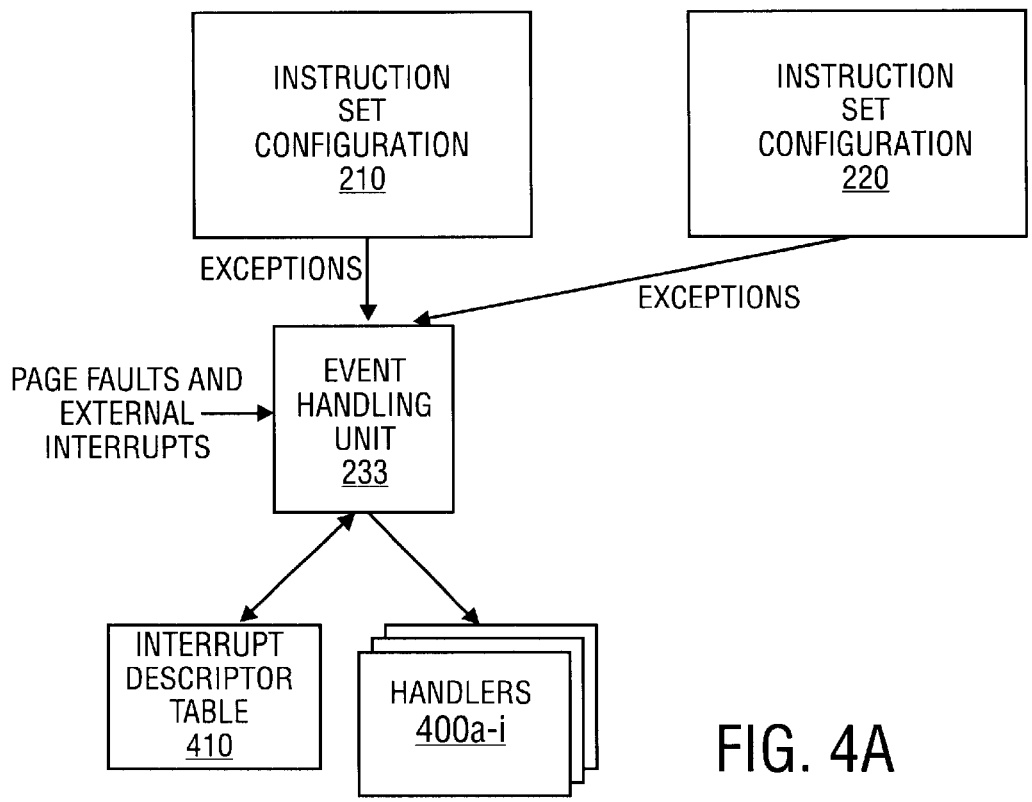
FIG. 4a is a functional block diagram illustrating one technique of event handling according to one embodiment of the invention.
Figure 4B:
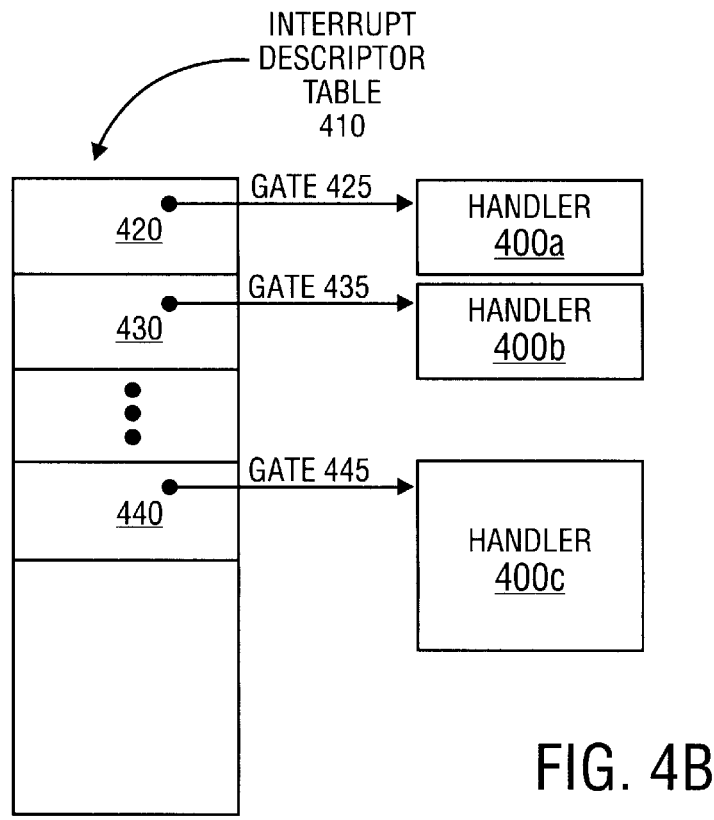
FIG. 4b is a functional block diagram illustrating the information stored when using the selectable configuration shown in FIG. 4a according to one embodiment of the invention.
Figure 5A:
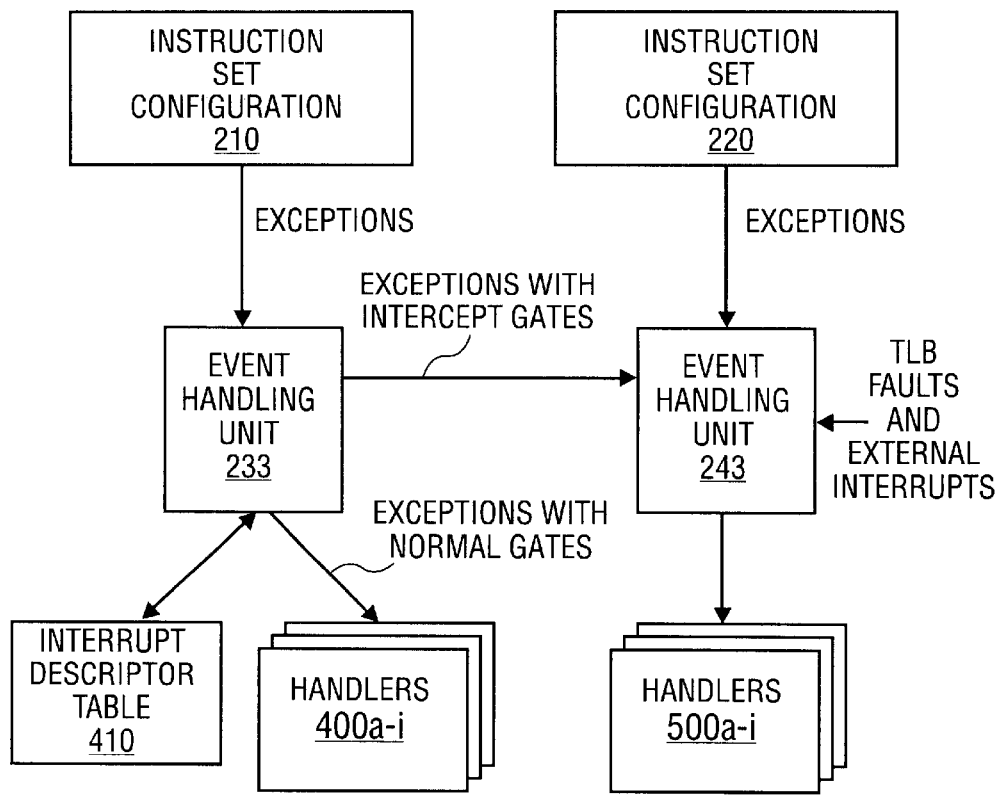
FIG. 5a is a functional block diagram illustrating another technique of event handling according to one embodiment of the invention.
Figure 5B:
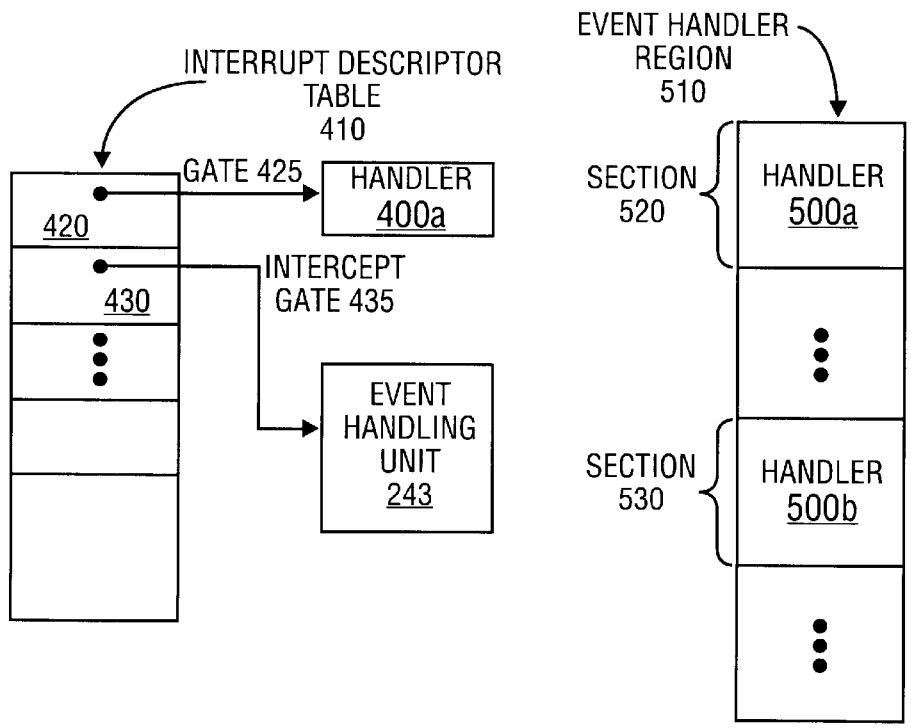
FIG. 5b is a functional block diagram illustrating the information stored when using the selectable configuration shown in FIG. 5a according to one embodiment of the invention.

As previously described, another aspect of the invention is that the processor has two event handling units for supporting two different event handling schemes. It is to be appreciated that any type of event handing techniques may be used. FIGS. 4a–b illustrate a first event handling technique used by event handling unit 233 according to one embodiment of the invention, while FIGS. 5a–b illustrate a second event handling technique used by event handling unit 243 according to one embodiment of the invention.

FIG. 4a is a functional block diagram illustrating the selectable configuration in which both instruction set configurations 210 and 220 are used in conjunction with event handling unit 233, while FIG. 4b is a functional block diagram illustrating the information used by event handling unit 233 according to one embodiment of the invention.

FIG. 4a shows instruction set configuration 210, instruction set configuration 220, event handling unit 233, and handlers 400a–i. FIG. 4a also shows: 1) that page faults and external interrupts are received by event handling unit 233; 2) that exceptions generated by instruction set configuration 210 are received by event handling unit 233; and 3) that exceptions generated by instruction set configuration 220 are received by event handling unit 233. As previously mentioned, event handling unit 233 uses an interrupt descriptor table in one embodiment of the invention. While in the configuration shown in FIG. 4a, the pointers (referred to herein as "gates") stored in this interrupt descriptor table include the address of each event's corresponding handler (also termed as "service routine"). Upon the delivery of an event, the processor calculates the address of the entry in the interrupt descriptor table to which the event corresponds, accesses the gate stored in that entry, and executes the handler identified by that gate. To calculate the address of the appropriate entries in the interrupt descriptor table, the processor (while in a mode compatible with the x86 protected mode) adds to the base address (i.e., the starting address) of the interrupt descriptor table the entry number multiplied by 8. For a further description of interrupt descriptor tables, see Shanley, Tom and Anderson, Don, ISA System configuration, MindShare, Inc. (1993).

FIG. 4b is a functional block diagram illustrating the information used by event handling unit 233 according to one embodiment of the invention. FIG. 4b shows an interrupt descriptor table 410, a handler 400a, a handler 400b, and a handler 400c, each of which are preferably stored in a memory. Interrupt descriptor table 410 includes an entry 420 storing a gate 425, an entry 430 storing a gate 435, and an entry 440 storing a gate 445. Gates 425, 435, and 445 identify the locations of handlers 400a, 400b, and 400c, respectively. Handlers 400a and 400b service existing x86 events and may be implemented to execute on instruction set configuration 210. However, to accommodate the new events generated by instruction set configuration 220, they are all mapped to one entry (e.g., entry 440) in interrupt descriptor table 410. In response to an event generated by instruction set configuration 220, the processor stores, in a predetermined area, event information identifying which event has occurred, accesses gate 445 stored in entry 440, and executes handler 400c. Handler 400c uses the event information stored by the processor to determine which event occurred so that it may execute the appropriate set of instructions to service the event. In one embodiment, handler 400c is implemented to execute on instruction set configuration 220. In this manner, compatibility with the existing x86 based event handling mechanism is maintained while allowing for the use of two instruction sets. In addition, operating system developers need only incorporate one extra handler and gate to take advantage of the two instruction sets. As a result, entirely new operating systems need not be developed by software developers or purchased by users to take advantage of the new instruction set.

FIGS. 5a–b show a method by which instruction set configurations 210 and 220 may be used in conjunction with event handling unit 243 according to one embodiment of the invention. FIG. 5a is a functional block diagram illustrating the selectable configuration in which both instruction set configurations 210 and 220 are used in conjunction with event handling unit 243, while FIG. 5b is a functional block diagram illustrating the information used by the event handling units while operating in the configuration shown in FIG. 5a.

FIG. 5a shows instruction set configuration 210, instruction set configuration 220, event handling unit 233, event handling unit 243, handlers 400a–i, and handlers 500a–i. FIG. 5a also shows: 1) that TLB (translation look-aside buffer) faults and external interrupts are received directly by event handling unit 243; 2) that exceptions generated by instruction set configuration 220 are received by event handling unit 243; 3) that exceptions generated by instruction set configuration 210 are received by event handling unit 233; and 4) that events received by event handling unit 233 may be serviced by executing the appropriate one of handlers 400a–i or transferred to event handling unit 243 using "intercept gates."

FIG. 5b is a block diagram illustrating the information used by the event handling units while operating in the configuration shown in FIG. 5a according to one embodiment of the invention. FIG. 5b shows interrupt descriptor table 410, handler 400a, and an event handler region 510. Event handler region 510 includes section 520 storing handler 500a and section 530 storing handler 500b. Interrupt descriptor table 410 includes entry 420 storing gate 512 and entry 430 storing intercept gate 435. Thus, comparing FIGS. 4b and 5b, the contents of entry 430 in FIG. 4b have been replaced with intercept gate 435 in FIG. 5b.

As previously described with reference to one embodiment of the invention, event handling unit 243 uses an event handler region which is divided into sections. One or more events are assigned to each section of the event handler region, and each section stores a handler for servicing its corresponding events. Upon the delivery of an event, event handling unit 243 stores event information identifying which event has occurred, calculates the address of the section of the event handler region to which the event corresponds, and causes the execution of the handler stored in that section. To calculate the address of the appropriate section, event handling unit 243 adds to the base address (i.e., the starting address) of the event handler region the event's corresponding section number multiplied by a predetermined value (e.g., 256).

When an exception generated by instruction set configuration 210 is received by event handling unit 233, event handling unit 233 accesses a gate from interrupt descriptor table 410 as previously described. However, while in the configuration shown in FIG. 5a, event handling unit 233 then inspects the accessed gate to determine whether it is a normal gate or an intercept gate. In one embodiment, this distinction is based on the state of an encoded bit field in the gate. A normal gate (e.g., gate 425) contains the address of the exception's corresponding service routine (e.g., handler 400a) according to the first system architecture. Upon accessing a normal gate, event handling unit 233 causes the processor to execute the handler identified by that gate (e.g., handler 400a). In contrast, an intercept gate (e.g., intercept gate 435) contains information identifying which event has occurred and that the event should be transferred to event handling unit 243. Upon accessing an intercept gate, event handling unit 233 transfers event information (e.g., exception codes, vector numbers, etc.) to event handling unit 243. Event handling unit 243 uses the event information to select the appropriate one of handlers 500a–i (e.g., handler 500b). Thus, to use the handlers corresponding to event handling unit 243 to service an exception generated by instruction set configuration 210, an intercept gate is stored in the entry of the interrupt descriptor table corresponding to that exception. In this manner, the operating system is able to program on a gate by gate basis, whether events generated by instruction set configuration 210 are delivered into handlers corresponding to event handling unit 233 or handlers corresponding event handling unit 243. Since the handlers corresponding to event handling unit 243 are written using the 64-bit instruction set, the processor must switch to utilizing instruction set configuration 220 when an intercept gate is encountered. In one embodiment, this is accomplished by storing a predetermined bit pattern in the intercept gate which causes the processor to switch to instruction set configuration 220. However, alternative embodiments could implement this in any number of ways. For example, handlers corresponding to event handling unit 243 which could be called via an intercept gate could begin with an instruction which causes the processor to switch to instruction set configuration 220.

Thus, in one described embodiment, either event handling unit may be used in conjunction with either instruction set. Therefore, software developers may incrementally, on a performance and cost-analysis basis, create operating systems which use the new event handling architecture.

As previously described, another aspect of the invention is that the processor supports two different memory management schemes. It is to be appreciated that any type of memory management techniques may be used. According to one embodiment of the invention, FIG. 6a illustrates a first memory management technique used by system configuration 230, while FIG. 6b illustrates a second memory management technique used by system configuration 240.

FIG. 6a illustrates a method by which instruction set configurations 210 and 220 may be used in conjunction with paging unit 236 according to one embodiment of the invention. FIG. 6a shows instruction set configuration 210, segmentation unit 215, instruction set configuration 220, and paging unit 236. FIG. 6a shows that instruction set configuration 210 generates effective addresses which are sent to segmentation unit 215, and that segmentation unit 215 translates these effective addresses into linear addresses and sends them to paging unit 236. However, instruction set configuration 220 generates linear addresses that are sent directly to paging unit 236. Paging unit 236 translates the linear addresses received from both segmentation unit 215 and instruction set configuration 220 into physical addresses according to the first paging technique. As previously described, paging unit 236 is implemented in a corresponding fashion to that of previous x86 based processors. The x86 paging technique uses two levels of memory-based tables containing paging information that is used to specify a physical address within a page. The first level, called the page directory, can address up to 1,024 tables in the second level, called page tables. Each page table can address up to 1,024 pages in physical memory. A linear address is translated into a physical address by dividing the linear address into three parts that specify the page table within a page directory, a page within that table, and an offset within that page. For a further description of paging, see Shanley, Tom and Anderson, Don, ISA System Configuration, MindShare, Inc. (1993).

FIG. 6b is a block diagram illustrating the selectable configuration in which both instruction set configurations 210 and 220 are used in conjunction with paging unit 246. FIG. 6b is identical to FIG. 6a, with the exception that paging unit 236 is replaced with paging unit 246. Thus, this configuration works in an identical manner to that of the previously described configuration, with the exception of the paging technique used by paging unit 246. Paging unit 246 is implemented to provide a demand-driven, paged, virtual memory system. However, the architecture leaves the definition of the translation algorithms and page data structures up to the operating system. To accomplish this, when reference is made to a linear address, the processor consults the TLB for the physical address mapping. If the required translation is not resident in the TLB, the processor issues a TLB-miss fault and request the operating system to supply the translation. Thus, the processor has no knowledge of the operating system's translation algorithm and the operating system is free to implement any desired paging scheme.

Thus, in one described embodiment, either instruction set can be used with either memory management scheme while maintaining compatibility with existing software. This allows the processor to execute either existing operating systems which use the x86 paging technique or new operating systems which use the new paging technique.

Figure 7:
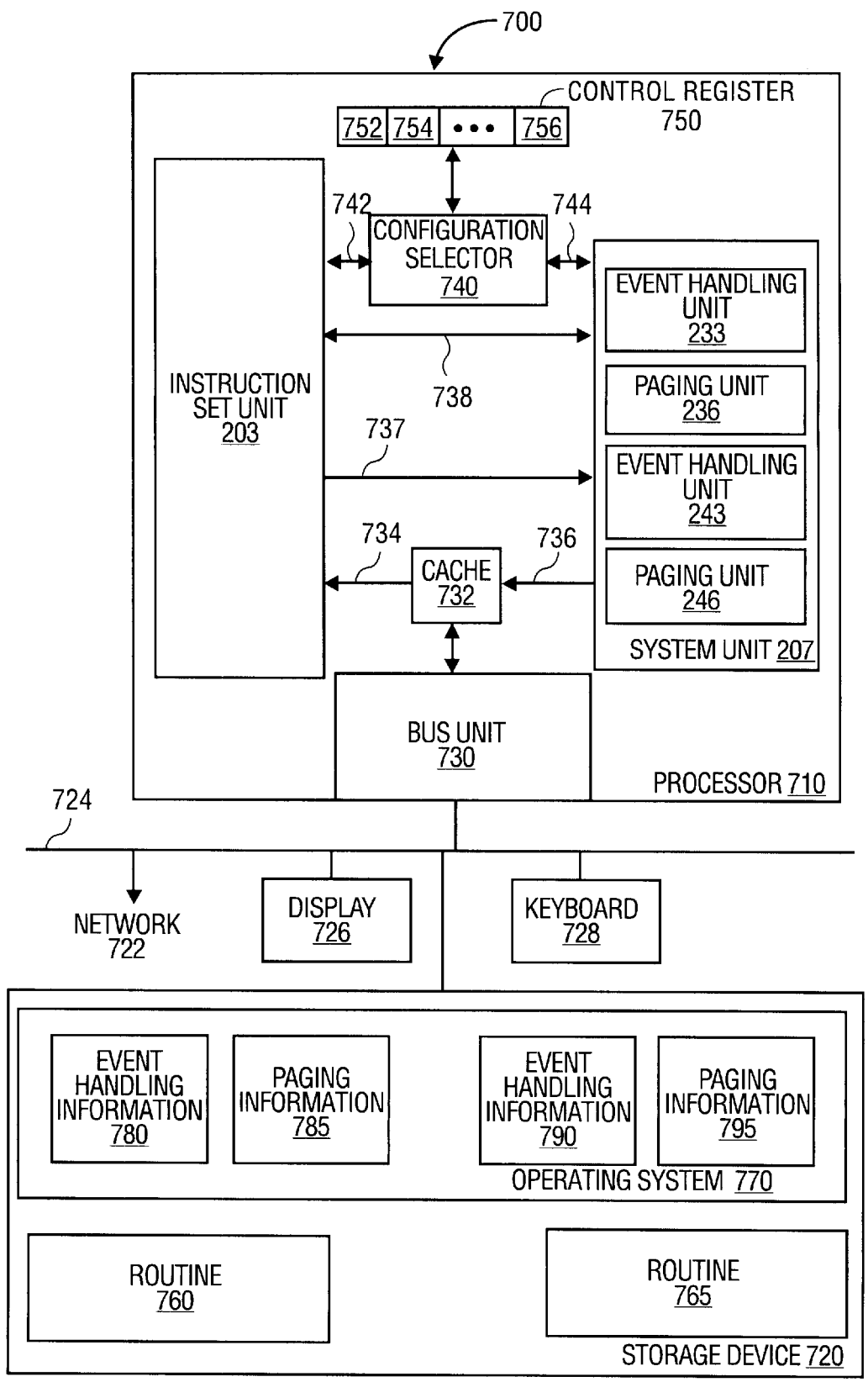
FIG. 7 is a functional block diagram of a computer system according to one embodiment of the invention.

FIG. 7 is a functional block diagram illustrating an exemplary computer system 700 according to one embodiment of the invention. Computer system 700 includes a processor 710, a storage device 720, a network 722, and a bus 724. Processor 710 is coupled to storage device 720 and network 722 by bus 724. In addition, a number of user input/output devices, such as a display 726 and a keyboard 728 are also coupled to bus 726. Processor 710 represents a central processing unit which may be implemented on one or more chips. Storage device 720 represents one or more mechanisms for storing data. For example, storage device 720 may include read only memory (ROM), random access memory (RAM), magnetic storage mediums, optical storage mediums, flash memory, etc. Bus 724 represents one or more busses (e.g., PCI, ISA, X-Bus, EISA, VESA, etc.) and bridges (also termed as bus controllers). While one embodiment is described in which the invention is implemented in a single processor computer system, the invention could be implemented in a multi-processor computer system.

FIG. 7 also illustrates that processor 710 includes a bus unit 730, a cache 732, instruction set unit 203, system unit 207, a configuration selector 740, and a control register 750. Of course, processor 710 contains additional circuitry which is not necessary to understanding the invention.

Bus unit 730 is coupled to cache 732. Bus unit 730 is used for monitoring and evaluating signals generated external to processor 710, as well as coordinating the output signals in response to input signals and internal requests from the other units and mechanisms in processor 710.

Cache 732 represents one or more storage areas for use by processor 710 as an instruction cache and a data cache. For example, in one embodiment cache 732 is a single cache used both as an instruction cache and a data cache. In an alternative embodiment, cache 732 includes separate instruction and data caches. In a third alternative embodiment, cache 732 includes separate instruction and data caches for instruction set configuration 210 and instruction set configuration 220 (at least 4 caches). Cache 732 is coupled to instruction set unit 203 by bus 734. In addition, cache 732 is coupled to system unit 207 by bus 736.

As previously described, instruction set unit 203 includes the hardware and firmware to decode and execute the x86 based instruction set (including the segmentation unit). Additionally, instruction set unit 203 also includes the necessary hardware and firmware to execute the 64-bit instruction set. In addition, instruction set unit 203 also represents circuitry for causing it to selectively operate in either instruction set configuration 210 or 220. One embodiment of instruction set unit 203 will be described later with reference to FIG. 8.

As previously described, system unit 207 includes the hardware and firmware to support two system architectures. Thus, system unit 207 includes a paging unit 236, an event handling unit 233, a paging unit 246, and an event handling unit 243. Paging unit 236 represents the hardware and firmware to access the x86 page tables, while paging unit 246 represents the hardware and firmware to access new operating system's paging algorithms. Event handling unit 233 represents the hardware and firmware to access the x86 interrupt descriptor table, while event handling unit 233 represents the hardware and firmware to access the new event handler region. System unit 207 also represents circuitry for causing it to selectively operate in modes which use either paging unit 236 and event handling unit 233 or paging unit 246 and event handling unit 243. In addition, system unit 207 includes circuitry which is shared by its selectable configurations, such as a TLB, status registers, interrupt controller, instruction pointer register, control registers, model-specific registers, and timer registers. One embodiment of system unit 207 will be described with reference to FIG. 9.

FIG. 7 additionally shows control register 750 including an instruction set indication 752 (acting as instruction set flag), a system indication 754 (acting as system flag), and an extension indication 756 (acting as extension enable flag). Configuration selector 740 is coupled to control register 750. Based on instruction set indication 752, configuration selector 740 transmits information over a bus 742 to instruction set unit 203 to select the appropriate instruction set configuration. Based on system indication 754, configuration selector 740 transmits information over a bus 744 to system unit 207 to select the appropriate system configuration. In addition, configuration selector 740 alters the states of the indications stored in control register 750 based on information it receives from instruction set unit 203 over bus 742. While one embodiment is described in which bits in registers on processor 710 are used for storing indications (e.g., instruction set indication 752), alternative embodiments could use any number of techniques. For example, alternative embodiments could store these indications off chip (e.g., in storage device 120) and/or could use multiple bits for each indication. In addition, FIG. 7 shows that instruction set unit 203 and system unit 207 are coupled by a bus 737 and a bus 738.

FIG. 7 also shows storage device 720 containing an operating system 770, a routine 760 and a routine 765. Of course, storage device 720 preferably contains additional software which is not necessary to understanding the invention. Routine 760 is code for execution by the instruction set configuration 210 and segmentation unit 215, whereas routine 765 is code for execution by instruction set configuration 220. Operating system 770 is the software which controls the allocation of usage of hardware resources, such as storage device 720, processor 710, and other peripheral devices in the computer system. Operating system 770 includes paging information 785, event handling information 780, paging information 795, and event handling information 790. Paging information 785 represents the software used in conjunction with paging unit 236, including a page directory and pages tables. In contrast, paging information 795 represents the software used in conjunction with paging unit 246, including the algorithm to perform the linear to physical address translation. Event handling information 780 represents the software used in conjunction with event handling unit 233, including the interrupt descriptor table and handlers. Whereas, event handling information 790 represents the software used in conjunction with event handling unit 243, including the event handler region. Thus, operating system 770 is a hybrid operating system which can utilize either system configuration and which can be used in conjunction with either instruction set configuration, provided by processor 710. While one embodiment using a hybrid operating system is described, alternative embodiments could use any type of operating system. For example, alternative operating systems may use only one system configuration.

Figure 8:
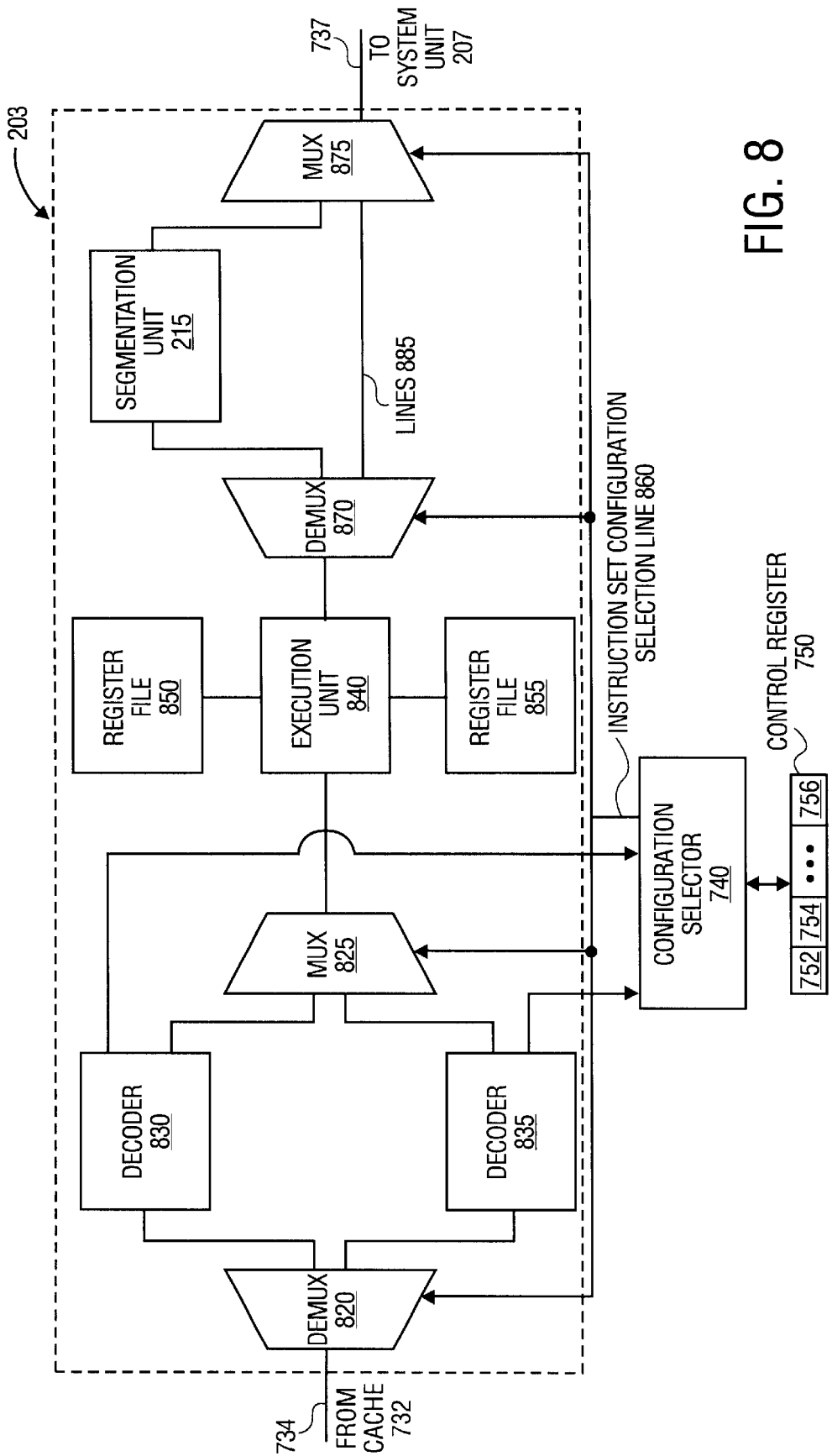
FIG. 8 illustrates a functional block diagram of instruction set unit 203 according to one embodiment of the invention.

FIG. 8 shows a functional block diagram of instruction set unit 203 according to one embodiment of the invention. Under this embodiment, instruction set unit 203 includes a demultiplexor 820, a decoder 830, a decoder 835, a multiplexor 825, an execution unit 840, a register file 850, a register file 855, a demultiplexor 870, segmentation unit 215, lines 885, and a multiplexor 875. Of course, instruction set unit 203 contains additional circuitry which is not necessary to understanding the invention (e.g., a program counter). Cache 732 is coupled to bus unit 730 for receiving and storing instructions from both the first and second instruction sets. Demultiplexor 820 is coupled to cache 732 by bus 734. Demultiplexor 820 is also coupled to selectively transmit instructions received from cache 732 to either decoder 830 or decoder 835. Decoder 830 decodes instructions from the x86 based instruction set, while decoder 835 decodes instructions from the 64-bit instruction set. Multiplexor 825 is coupled to decoder 830 and decoder 835 for transmitting the decoded instructions from decoders 830 and 835 to execution unit 840.

Execution unit 840 represents the necessary hardware (such as ALUs, floating point units, control registers, etc.) and firmware to execute the decoded instructions from both instruction sets. Execution unit 840 is coupled to register files 850 and 855 for storing values related to the x86 and 64-bit instruction sets, respectively. Thus, register file 850 contains 32-bit registers, while register file 855 contains 64-bit registers. Both instruction sets include instructions which cause execution unit 840 to access values stored in the other instruction sets corresponding register file. For example, one or more of the instructions in the x86 based instruction set will cause execution unit 840 to access values stored in register file 855. Likewise, one or more of the instructions in the 64-bit instruction set will cause execution unit 840 to access values stored in register file 850. In this manner, routines written in one instruction set can access values being used by routines written in the other instruction set. This allows single programs to be written partially in each instruction set. While one embodiment is described which has two register files (one for each instruction set), alternative embodiments may have only one register file which is shared by both instruction sets. In such an alternative embodiment, the previously described instructions for transferring values between the separated register files would not be used.

Demultiplexor 870 is coupled to execution unit 840, segmentation unit 215 and lines 885 for selectively transmitting effective addresses generated by the x86 based instruction set to segmentation unit 880 and linear addresses generated by the 64-bit instruction set directly to multiplexor 875. Segmentation unit 215 translates the effective addresses corresponding to the x86 based instruction set into linear addresses as previously described. Multiplexor 875 is coupled to segmentation unit 215, lines 885, and bus 737 for transmitting the linear addresses generated by both segmentation unit 215 and the 64-bit instruction set to system unit 207.

To provide for the selection of the appropriate instruction set configuration and system configuration, decoders 830 and 835 are coupled to configuration selector 740. In addition, configuration selector 740 is coupled to demultiplexor 820, multiplexor 825, demultiplexor 870, and multiplexor 875 by instruction set configuration selection line 860. When decoder 830 receives one of the instructions in the x86 based instruction set which instructs the processor to switch to the 64-bit instruction set, decoder 830 transmits a signal to configuration selector 740. In response to this signal, configuration selector 740 alters the state of instruction set indication 752 to select instruction set configuration 220. When instruction set configuration 210 is selected, configuration selector 740 transmits a signal on line 860 which causes decoder 830 and segmentation unit 215 to be selected. However, when decoder 835 receives one of the instructions in the 64-bit instruction set which instructs the processor to switch to the x86 based instruction set, decoder 835 transmits a different signal to configuration selector 740. In response to this signal, configuration selector 740 alters the state of instruction set indication 752 to select instruction set configuration 210. When instruction set configuration 220 is selected, configuration selector 740 transmits a signal on line 860 which causes decoder 835 and lines 885 to be selected.

When either decoder 830 or decoder 835 receives one of the instructions which instruct the processor to switch to system configuration 240, a signal is transmitted to configuration selector 740. In response to this signal, configuration selector 740 alters the state of system indication 754 such that system configuration 240 is selected. However, when one of the instructions which instruct the processor to system configuration 230, a different signal is transmitted to configuration selector 740. In response to this signal, configuration selector 740 alters the state of system indication 754 such that system configuration 230 is selected.

Configuration selector 740 also controls the extension indication 756 in control register 750. If extension indication 756 indicates the disable state, configuration selector 740 will not allow for the selection of instruction set configuration 220 or system configuration 240. Rather, when the extension flag indicates the disable state and decoder 830 receives one of the instructions in the x86 based instruction set which instructs the processor to switch to the 64-bit instruction set or system configuration 240, a disabled 64-bit fault will occur. However, when decoder 835 receives an instruction which instructs the processor to enable the 64-bit extension, an extension signal is transmitted to configuration selector 740. In response to this extension enable signal, configuration selector 740 alters the state of extension indication 756 such that the selection of instruction set configuration 220 and system configuration 240 is enabled. Likewise, control register 750 may also contain an x86 instruction set disable flag.

While one mechanism has been described for switching between the instruction set configurations, alternative embodiments could use any number of alternative combinations of hardware, firmware and/or software. See "Method and Apparatus for Transitioning Between Instruction Sets in a Processor," filed on Feb. 10, 1995, Ser. No. 08/386,931. For example, rather than using configuration selector 740, an alternative embodiment may be implemented in which demultiplexors 820 and 870 receive signals directly from decoder 830 and 835 to select between the two instruction set configurations. As another example, an alternative embodiment could use two execution units, one for each instruction set.

In another alternative embodiment, decoder 830 is replaced with a hardware or software translator that translates instructions from the x86 based instruction set into instructions in the 64-bit based instruction set. The output of the translator is coupled to the input of decoder 835. In addition, multiplexor 825 is removed and the output of decoder 835 is coupled to execution unit 840. Decoder 835 is coupled to configuration selector 740 for controlling the selection of the appropriate instruction set. As a result, decoder 835 and execution unit 840 may be implemented to process instructions from only the 64-bit instruction set. In another version of the above alternative embodiment, cache 732 is moved such that bus 734 is coupled to demultiplexor 820 rather than cache 732, an output of demultiplexor 820 is coupled to an input of cache 732 rather than decoder 835, the output of the translator is also coupled to the input of cache 732 rather than decoder 835, and the output of cache 732 is coupled to decoder 835. Thus, in this version of the alternative embodiment, instructions from the x86 based instruction set are translated prior to being stored in the instruction cache. In addition, a data cache is added.

As another example, an alternative embodiment includes a state machine (rather than multiplexors, demultiplexors, and a configuration selector) which provides for the selection of two separate instruction paths, one for each instruction set. Each of these instruction paths includes a separate instruction cache, decoder, and execution unit, as well as including the separate register files previously described. The two execution units are coupled to the state machine for causing the selection of the appropriate instruction set configuration in response to the execution of instructions instructing the processor to switch instruction set configurations.

Figure 9:
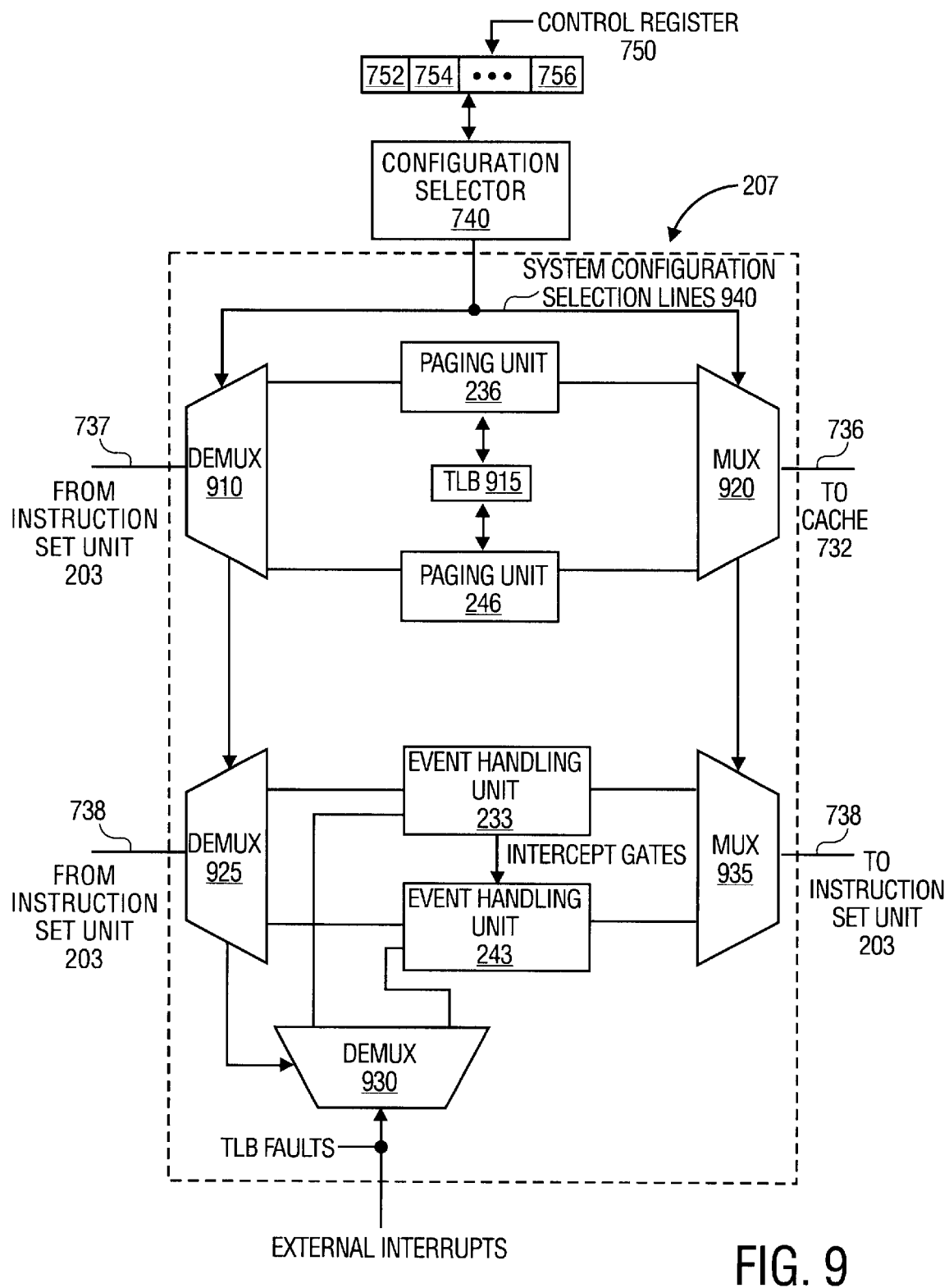
FIG. 9 illustrates a functional block diagram of system unit 207 according to one embodiment of the invention. While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

FIG. 9 illustrates a functional block diagram of system unit 207 according to one embodiment of the invention. Under this embodiment, system unit 207 includes a demultiplexor 910, a translation lookaside buffer (TLB) 915, a multiplexor 920, a demultiplexor 925, a demultiplexor 930, and a multiplexor 935. Of course, system unit 207 includes additional circuitry which is necessary to understanding the invention.

Demultiplexor 910 is coupled to instruction set unit 203 by bus 737 to receive linear addresses requiring translation. Demultiplexor 910 is also coupled to paging unit 236 and paging unit 246 for selectively transmitting these linear addresses to either paging unit 236 or paging unit 246. Both paging unit 236 and paging unit 246 are coupled to TLB 915. As previously described, paging unit 236 performs linear address to physical address translations according to a first paging technique, while paging unit 246 performs linear address to physical address translations according to a second paging technique. To speed up the paging translations, certain of the translations are stored in TLB 915. Upon receiving a linear address requiring translation, the selected paging units first search TLB 915. If the translation is stored in TLB 915, the selected paging unit passes on the physical address. However, if the translation is not stored in TLB 915, the selected paging unit performs the translation according to its paging technique. TLB 915 represents one or more translation lookaside buffers. For example, in one embodiment each of paging unit 236 and paging unit 246 have separate translation lookaside buffers. In this embodiment, the TLB need not be flushed when the processor switches system configurations. In an alternative embodiment, paging unit 236 and paging unit 246 share a translation lookaside buffer. In this alternative embodiment, the translation lookaside buffer must be flushed each time the processor switches system configurations. Multiplexor 920 is coupled to paging unit 236 and paging unit 246 for transmitting the physical addresses provided by paging unit 236 and paging unit 246 back to cache 732 using bus 736.

Demultiplexor 925 is coupled to bus 738 for receiving exception information (e.g., vector numbers, exception codes, flags, etc.) from instruction set unit 203. This exception information is generated by decoder 830, decoder 835, execution unit 840, and segmentation unit 815. The coupling of bus 738 to these units is not shown so as not to obscure the invention. Similarly, demultiplexor 930 is coupled to receive TLB faults and external interrupts. Demultiplexor 925 and demultiplexor 930 are coupled to event handling unit 233 and event handling unit 243 for selectively transmitting exceptions to either event handling unit 233 or event handling unit 243. When an exception is received, either event handling unit 233 or event handling unit 243 is used to determine the starting address of the appropriate handler based on the current status of demultiplexor 925. However, when a TLB fault or an external interrupt is received, either event handling unit 233 or event handling unit 243 is used to determine the starting address of the appropriate handler based on the current status of demultiplexor 930. Multiplexor 935 is coupled to event handling unit 233 and event handling unit 243 for receiving the starting address of the appropriate handler. Multiplexor 935 is also coupled to bus 738 for transmitting that starting address to instruction set unit 203. Upon receiving this starting address, instruction set unit 203 begins executing the handler stored at that starting address (e.g., this starting address is stored in the program counter). Of course, additional steps are perform when servicing and event, such as interrupting execution of the current process, storing the interrupted process' execution environment (i.e., the information necessary to resume execution of the interrupted process), etc. Upon completing the servicing of the event, the invoked handler instructs the processor to resume execution of the interrupted process using the previously stored execution environment.

To provide for the selection of the appropriate system configuration, configuration selector 740 is coupled to demultiplexor 910, multiplexor 920, demultiplexor 925, demultiplexor 930, and multiplexor 935 by system configuration selection line 940. While system indication 754 indicates system configuration 230 is selected, configuration selector transmits a signal on line 940 which causes paging unit 236 to be selected. However, while the state of system indication 754 indicates system configuration 240 is currently selected, configuration selector 740 transmits a signal on line 940 which causes paging unit 246 to be selected. While the state of system indication 754 indicates system configuration 230 is selected, event handling unit 233 is selected. Thus the processor is operating in the mode shown in FIGS. 4a and 4b. In contrast, when system indication 754 indicates system configuration 240 is selected, events are handled as shown with reference to FIGS. 5a and 5b. That is, exceptions generated by instruction set configuration 210 are delivered to event handling unit 233, exceptions generated by instruction set configuration 220 are delivered to event handling unit 243, and TLB faults and external interrupts are delivered to event handling unit 243. In addition, events received by event handling unit 233 may be transferred to event handling unit 243 using intercept gates. Thus, when system indication 754 indicates system configuration 240 is selected, the selection of the appropriate event handling unit for exceptions is based on instruction set indication 752. In contrast, the servicing of TLB faults and external interrupts is selected based on the state of system indication 754. When switching system configurations, it is necessary to store the necessary information for use by the selected system configuration (e.g., paging tables, paging algorithms, handlers, etc.)

While one mechanism has been described for switching between system configurations, alternative embodiments could use any number of alternative combinations of hardware, firmware and/or software. For example, one alternative embodiment includes a state machine (rather than multiplexors, demultiplexors, and a configuration selector) which provides for the selection of the separate paging and event handling units. In another alternative embodiment, paging is provided using a single paging state machine (rather than having demultiplexor 910, multiplexor 920, and separate paging units). In this embodiment, the paging state machine is coupled to bus 737, bus 736, and control register 750. In yet another alternative embodiment, event handling is provided using a single event handling state machine (rather than having demultiplexor 925, demultiplexor 930, multiplexor 935, and separate event handling units). In this embodiment, the event handling state machine is coupled to bus 738 and control register 750. As another example, an alternative embodiment does not use intercept gates and events are serviced by the currently selected event handling unit (regardless of which instruction set configuration generated the events). As another example, an alternative embodiment does not use intercept gates and events are serviced by the event handling unit which receives the event (events generated by instruction set configuration 210 are serviced by event handling unit 233; events generated by instruction set configuration 220 are serviced by event handling unit 243). In another alternative embodiment, events can also be transferred from event handling unit 243 to event handling unit 233.

Thus, a processor is described which has two different system configurations. In addition, the processor has two instruction sets which may operate in conjunction with the two system configurations. Furthermore, the processor includes one or more instructions for causing the processor to transition between instruction sets and to transition between system configurations. In so doing, a computer system containing this processor has the flexibility to execute existing x86 software and provide for a long-term transition to newer 64-bit software—e.g., existing x86 software can be made to run on the computer system until new 64-bit software can be written and made available.

An Alternative Embodiment

In one alternative embodiment of the invention, the instruction set architecture 120 may not be used with system architecture 130. In this alternative embodiment, the processor boots using instruction set configuration 220 and system configuration 240. To provide for the selection of the different configurations, the processor contains a control register with in which it stores the instruction set flag and the system configuration flag (the extensions enable flag is not used). The instruction set flag and system configuration flag allow for selecting between the modes represented in FIG. 2 by lines 1, 2, and 4 (the mode illustrated by line 3 is not supported). Since the processor does not support the mode illustrated by line 3, if and when operating system 330 is using system configuration 230, only code written in the instruction set supported by instruction set configuration 210 can be executed—e.g., that portion of the operating system which uses system configuration 230 must be written in the first instruction set; routine 310 can be executed because it is written in the first instruction set; routine 320 cannot be executed because it is written in the second instruction set. With reference to FIGS. 4a–b, event handling unit 233 does not receive exceptions from instruction set configuration 220 under this alternative embodiment. As a result, entry 440, gate 445, and handler 400c are not used as previously described. With reference to FIG. 6a, paging unit 236 does not receive linear addresses from instruction set configuration 220 under this alternative embodiment.

In another version of the alternative embodiment, event handling under system configuration 240 is handled in a similar fashion to that of system configuration 230. In this alternative embodiment, exceptions generated by instruction set configuration 210 are sent directly to event handling unit 243 (in a similar fashion to that shown in FIG. 4*a*). In response to an event, the processor stores information identifying which event has occurred, calculates the address of the section of the event handler region to which the event corresponds (all events generated by instruction set configuration 210 correspond to one event handler region), and cause the execution of the handler stored in that section. The handler for the events generated by instruction set configuration 210 determines which event occurred using the information stored by the processor.

Other Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An article comprising a machine readable medium storing data representing a processor comprising:
  an instruction set unit to support a first and second instruction sets, problems arising during processing of instructions from said first and second instruction sets respectively causing a first and second set of events; and
  an event handling unit to cause said processor to execute the appropriate one of a first plurality of event handlers, at least some of said first set of events being mapped to different ones of the first plurality of event handlers, all of the second set of events being mapped to a first event handler of said first plurality of event handlers.

2. The article of claim 1, wherein:
  said event handling unit, responsive to each of said second set of events, to record which of said second set of events has occurred and to cause the processor to execute said first event handler; and
  said first event handler to cause said processor to determine which of said second set of events has occurred based on the record.

3. The article of claim 2, further comprising:
  said first event handler, responsive to each of said second set of events, to cause said processor to access an interrupt vector table, said interrupt vector table having entries identifying different ones of a second plurality of event handlers for said second set of events based on which of said second set of events has occurred and select the identified one of said second plurality of event handlers.

4. The article of claim 3, wherein the first plurality of event handlers are written in instructions from the first instruction set, and the second plurality of event handlers are written in instructions from said second instruction set.

5. The article of claim 4, wherein said second instruction set is compatible with the x86 instruction set.

6. The article of claim 3, wherein the first plurality of event handlers are to be accessed from an event handler region, the event handler region being divided into sections with each of said first plurality of event handlers being accessed from a different one of said sections.

7. The article of claim 6, wherein said first event handler, responsive to the occurrence of one of said events, calculates the address of the appropriate section in the event handler region by adding a base address of the event handler region with a predetermined value multiplied by a number assigned to the section assigned to the occurred event.

8. The article of claim 2, wherein the first plurality of event handlers are to be accessed from an event handler region, the event handler region being divided into sections with each of said first plurality of event handlers being accessed from a different one of said sections.

9. The computer system of claim 2, wherein said first event handler, responsive to the occurrence of one of said events, calculates the address of the appropriate section in the event handler region by adding a base address of the event handler region with a predetermined value multiplied by a number assigned to the section assigned to the occurred event.

10. An article comprising a machine readable medium having stored thereon a plurality of instructions which, if executed by a machine, cause the machine to perform operations comprising:
  responsive to detecting the occurrence of an event arising as a result of processing instructions from either a first or a second instruction set, wherein problems arising during the processing of instructions from said first and second instruction sets respectively causes a first and second set of events, performing the following,
  calculating the address of one of a first plurality of event handlers written to handle said event, wherein at least some of said first set of events are assigned to different ones of said first plurality of event handlers, and all of said second set of events are mapped to a first of said first plurality of event handlers; and
  executing the event handler stored at the calculated address.

11. The article of claim 10, wherein:
  said detecting includes for each of said second set of events, recording which of said second set of events has occurred; and
  said executing includes,
    responsive to executing said first event handler, determining which of said second set of events has occurred based on the record.

12. The article of claim 10, wherein:
  said detecting includes for each of said second set of events, recording which of said second set of events has occurred; and
  said executing includes,
    responsive to executing said first event handler, determining which of said second set of events has occurred based on the record, wherein a interrupt vector table has stored in its entries data identifying different ones of a second plurality event handlers for said second set of events; and
    accessing an entry of said interrupt vector table based on which of said second set of events has occurred;
    executing the one of said second plurality of event handlers identified by the accessed entry of said interrupt vector table.

13. An article comprising a machine readable medium having stored thereon a plurality of instructions which, if executed by a machine, cause the machine to perform operations comprising:
  responsive to detecting an event indicating a problem has arisen during the processing of instructions from a first instruction set and recording which of a first plurality of events has occurred, performing the following, calculating the address of a first of a first plurality of event handlers, wherein said first plurality of event handlers are stored in an event handling region, said event handling region being divided into sections with each section storing one of said first plurality of event handlers;

executing the one of said first plurality of event handlers stored at said calculated address, said executing including, determining which of said first plurality of events has occurred based on said record, wherein each entry of an interrupt vector table is assigned to one of said first plurality of events, said entries having stored therein data identifying different ones of a second plurality of event handlers; and accessing the entry of the interrupt vector table for the detected event; and executing the one of said second plurality of event handlers identified by the accessed entry in the interrupt vector table.

14. The article of claim 13, wherein the first instruction set is compatible with the x86 instruction set.

15. The article of claim 13, wherein the detecting includes the event indicating the problem has arisen during the processing of instructions from a second instruction set.

* * * * *